United States Patent [19]
Poradish et al.

[11] Patent Number: 5,905,545
[45] Date of Patent: *May 18, 1999

[54] FULL-COLOR PROJECTION DISPLAY SYSTEM USING TWO LIGHT MODULATORS

[75] Inventors: Frank Poradish, Plano; James M. Florence, Richardson, both of Tex.

[73] Assignee: Texas Instruments Incorporated, Dallas, Tex.

[*] Notice: This patent is subject to a terminal disclaimer.

[21] Appl. No.: 08/700,329

[22] Filed: Aug. 8, 1996

Related U.S. Application Data

[63] Continuation-in-part of application No. 08/379,391, Jan. 27, 1995, Pat. No. 5,612,753.

[51] Int. Cl.⁶ ............................... H04N 9/12; H04N 5/74
[52] U.S. Cl. ...................... 348/743; 348/771; 348/756
[58] Field of Search ................................ 348/756, 757, 348/779, 780, 742, 743, 771, 781, 270, 269, 271, 65, 71; 359/583, 589, 496, 492, 487, 489; H04N 5/64, 5/74, 9/31, 9/12

[56] References Cited

U.S. PATENT DOCUMENTS

| | | | |
|---|---|---|---|
| 2,422,376 | 6/1947 | Turner et al. ............................ | 359/583 |
| 2,809,570 | 10/1957 | Dearing et al. ......................... | 359/583 |
| 4,415,233 | 11/1983 | Itoh et al. ................................ | 359/583 |
| 4,687,301 | 8/1987 | Ledebuhr ................................. | 348/338 |
| 5,612,753 | 3/1997 | Poradish et al. ........................ | 348/743 |
| 5,689,314 | 11/1997 | Mercer ....................................... | 349/1 |

*Primary Examiner*—Michael Lee
*Attorney, Agent, or Firm*—Charles A. Brill; Frederick J. Telecky, Jr.; Richard L. Donaldson

[57] ABSTRACT

A full color projection system is disclosed herein. The projection system includes a means for generating a first light beam and also a means for generating a second light beam. These means may include either separate light sources 10a and 10b or a single light source 10 and a means for dividing the light source into the first and second light beams. In two examples, the means for dividing may include either a dichroic color wheel 40 or a color splitting prism 52. When a color splitting prism is used, they prisms are separated by an air gas where the distance of the air gap is determined by the size of spacer balls suspended in an adhesive between the two prisms. The first light beam will be modulated by a first spatial light modulator 30a and the second light beam will be modulated by a second spatial light modulator 30b. These spatial light modulators 30a and 30b are preferably, but not in necessarily digital micromirror devices.

6 Claims, 3 Drawing Sheets

FULL-COLOR PROJECTION DISPLAY SYSTEM USING TWO LIGHT MODULATORS

This patent application is a continuation in part of U.S. patent application Ser. No. 08/379,391, filed Jan. 27, 1995, now U.S. Pat. No. 5,612,753.

CROSS-REFERENCE TO RELATED APPLICATIONS

The following patents and/or commonly assigned patent applications are hereby incorporated herein by reference:

| Patent No. | Filing Date | Issue Date | TI Case No. |
|---|---|---|---|
| 4,337,759 | 02/27/81 | 07/06/82 | — |
| 5,061,049 | 09/13/90 | 10/29/91 | TI-13173B |
| 5,079,544 | 02/27/89 | 01/07/92 | TI-13978 |
| 5,083,857 | 06/29/90 | 01/28/92 | TI-14568 |
| 5,101,236 | 12/21/89 | 03/31/92 | TI-14585 |
| 5,172,161 | 12/31/90 | 12/15/92 | TI-15602 |
| 5,339,116 | 10/15/93 | 08/16/94 | TI-15721A.1 |
| 5,420,524 | 03/28/94 | 07/04/95 | TI-15602AC |
| 08/658,783 | 06/05/96 | | TI-18859AAA |
| 08/315,997 | 09/30/94 | | TI-18734 |

FIELD OF THE INVENTION

This invention generally relates to display and printer systems and specifically to printer and display systems having an architecture which uses two light modulators.

BACKGROUND OF THE INVENTION

Digital micro-mirror devices (also referred to as deformable mirror devices or simply DMDs) are finding many uses in light deflecting technologies. In operation, the devices are akin to small mirrors which rotate about a fixed axis. The rotation causes light to be deflected under control of the rotation. Thus, in an array of DMDs each device, or pixel, can be selectively rotated thereby patterning light reflected from the array.

Digital micro-mirror devices can be used in a wide variety of applications. These applications include displays such as television (e.g., high definition television), computer monitors and other video displays. An example of a video display system is disclosed in U.S. Pat. No. 5,079,544. The DMDs can also be used in printer applications including printers, photocopiers and facsimile machines. An example of a printer system is disclosed in U.S. Pat. No. 5,101,236. Further, DMDs can be used in other applications including video cameras.

A full-color projection display is typically implemented by simultaneously projecting the images of three light modulators, one for each of the primary colors—red, green and blue. If however the light modulator can be addressed fast enough, it is possible to implement a full-color projector with a single modulator and an illumination system that sequentially delivers red, green and blue light to the modulator, such as a rotating color wheel. In this system, the projected color fields are integrated by the eye over the frame time to form the full color image.

Since the digital-micromirror device (DMD) modulator can be addressed fast enough to implement the field sequential system, this method is typically preferred due to the reduced amount of system hardware. However, the single light modulator system can project only about one third of the total lumens to a screen that a three modulator system can. As a result, the range of applications for single modulator systems is limited.

In addition, the field sequential projector has several artifacts that are associated with the different color fields being projected at different times. As an example, these artifacts may cause moving objects on the screen to appear fringed around the end to one looking at the screen. Finally, there are certain lamps that are used for projection systems that do not have proper color balance, i.e., they are deficient in one of the three primary colors. Both single modulator and three modulator systems must sacrifice some of the total brightness in order to color balance a system using this type of lamp.

SUMMARY OF THE INVENTION

A full color projection system is disclosed herein. The projection system includes a means for generating a first light beam and also a means for generating a second light beam. These means may include either separate light sources or a single light source and a means for dividing the light source into the first and second light beams. In two examples, the means for dividing may include either a dichroic color wheel or a color splitting prism. The first light beam will be modulated by a first spatial light modulator while the second light beam will be modulated by a second spatial light modulator. These spatial light modulators are preferably, but not necessarily, digital micromirror devices. When a color splitting prism is used, the prisms are separated by a prescribed distance, and the distance is controlled by the size of spacer balls that are suspended in the adhesive between prisms.

The invention provides increased brightness since twice as many lumens can be projected within the full color image. In addition, the system may be designed so as to minimize or reduce the field sequential color separation artifacts. Continuous projection of all colors (i.e. 3-modulator systems) eliminates color separation artifacts. In a two-modulator system the most offending color (typically red) can be displayed continuously while the other two colors can be sequenced faster due to the additional timeline available relative to a single chip system (i.e. 50% per color vs 33% per color) or (66% per color vs 33% per color). In addition, the system may be designed so as to reduce gray level contouring artifacts or extend the projected number of gray levels.

DESCRIPTION OF THE DRAWINGS

The above features of the present invention will be more clearly understood from consideration of the following descriptions in connection with accompanying drawings in which:

FIGS. 1, 2, 2a and 3 provide three embodiments for a color projection system of the present invention.

DETAILED DESCRIPTION OF ILLUSTRATIVE EMBODIMENTS

The making and use of various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

Figure 1:
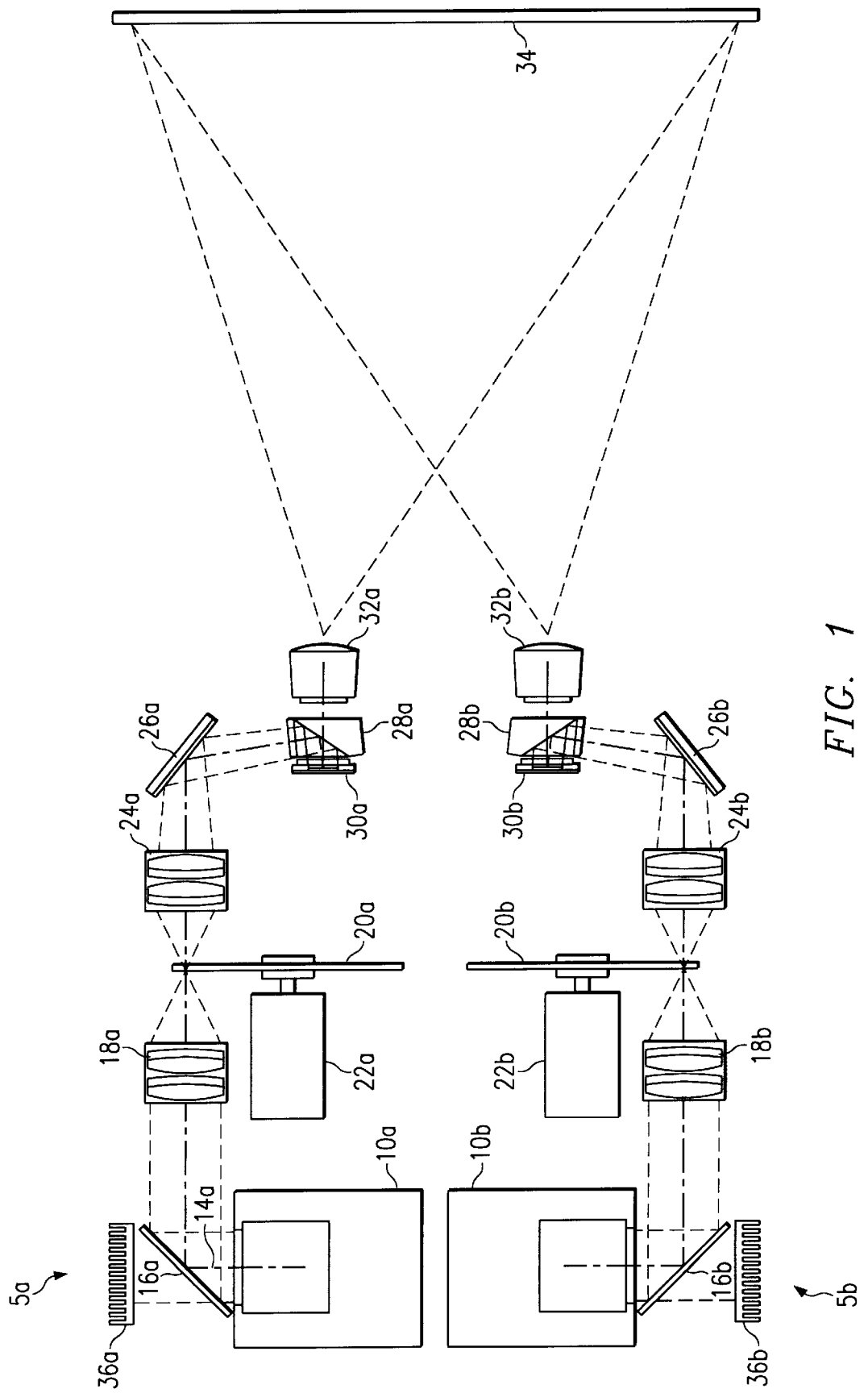
Figure 2:
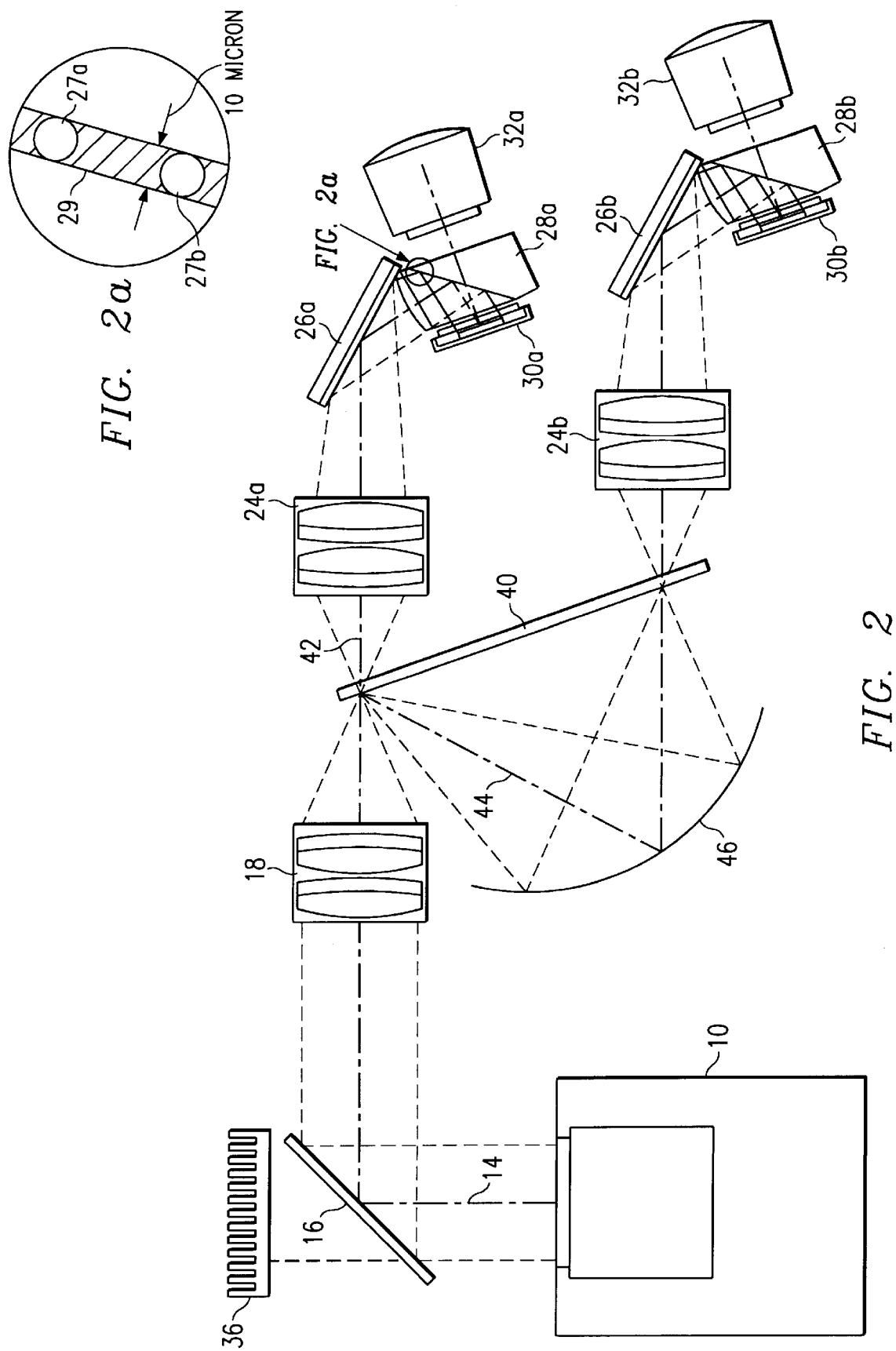
Figure 3:
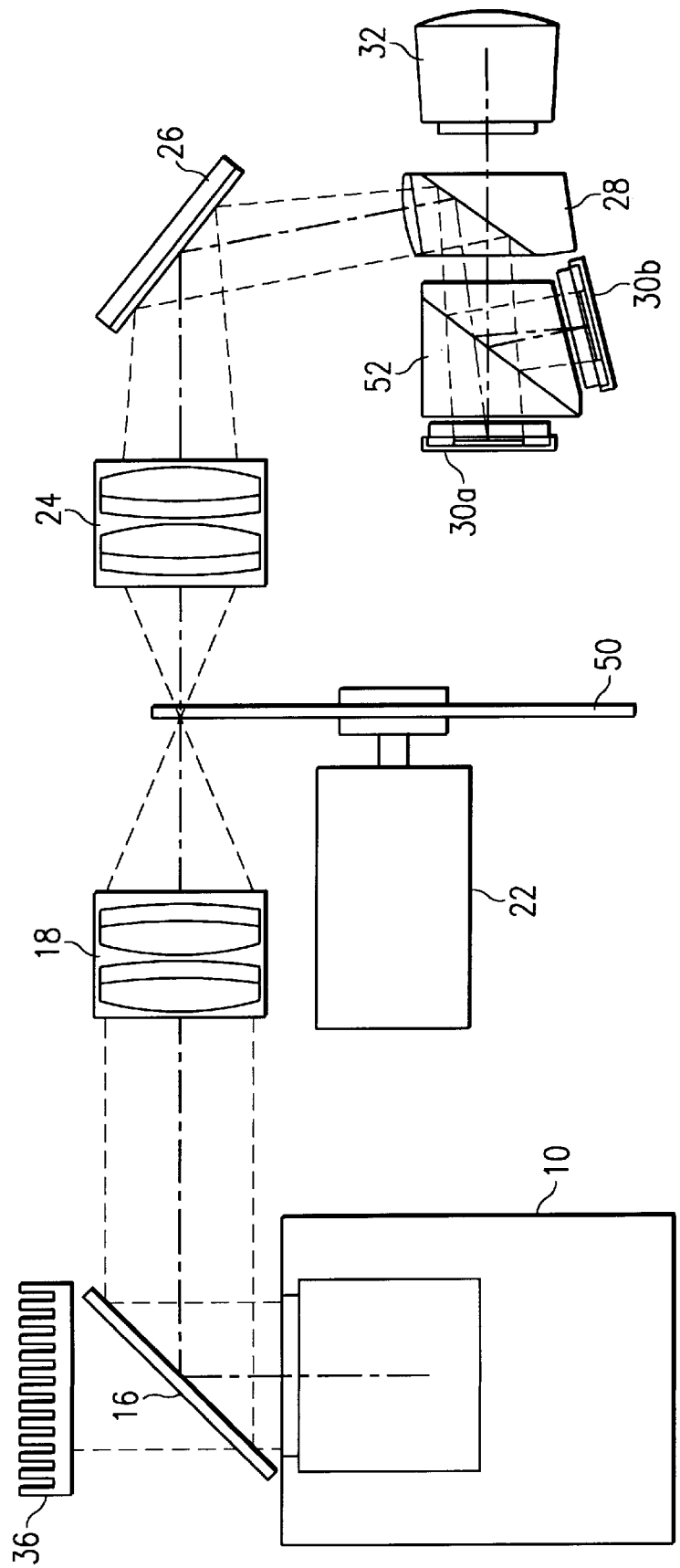

The systems presented herein implement a full color display system using two light modulators. These systems achieve the result of approximately doubling the total projected lumens. In one aspect, the present invention provides a display system which includes means for generating a first and second light beams and two spatial light modulators for receiving these light beams and directed a modulated version of the light to a screen. Each of FIGS. 1, 2 and 3 illustrate specific examples of embodiments which utilize this basic concept. It should be understood, however, that other systems utilizing two spatial light modulators could also be utilized.

The conceptually simplest of the embodiments includes two single modulator systems 5a and 5b which operate simultaneously and converge the projected images. This solution is illustrated in FIG. 1. Referring now to FIG. 1, first and second light sources 10 and 12 are provided. The first light source 10a (e.g., a xenon arc lamp) generates a light beam (illustrated by the light path 14a) which will reflect off of mirror 16a (e.g., a cold mirror) toward lens system 18a. A heat sink 36a may be utilized to prevent the mirror 16a from over heating. The lens system 18a must comprise an achromats (air-space) with two 100 mm focal length lens.

The lens system 18a will focus the light beam on color wheel 20a. The color wheel 20a may comprise any diameter color wheel that will fit in the system. As an example, a six inch color wheel 20a may be used. The color wheel 20 will be rotated by color wheel motor 22a. As is known in the art, color wheel 20a may be segmented such that different portions of the color wheel 20a will transmit different color lights. For example, the color wheel 20a may comprise three equal size sections where the first section will pass red light, the second section will pass blue light, and the third section will pass green light.

Light from the color wheel 20a will be directed to lens system 24a which may comprise an achromats (cemented) with two 100 mm focal length lens. The light from lens system 24a may then be directed to mirror 26a (e.g., cold mirror) and then to total internal reflection (TIR) prism 28a.

The TIR prism 28a is designed so as to reflect the light coming from mirror 26a to spatial light modulator 30a via total internal reflection due to the air gap created by the spacer balls 27a and 27b of FIG. 2a suspended in the adhesive 29 between the two prisms. The spatial light modulator 30a will modulate the light and direct it back to total internal reflection prism 28a which will then transmit the light through the air gap to lens 32a. The lens 32a may then project the light to a screen 34. In this context, screen 34 may comprise any item or region within the system which requires the projected image. In the preferred embodiment, the lens 32a may comprise a 28 mm fixed f/2.8 lens or a 20–70 mm zoom f/3.5 SLR camera lens.

In the preferred embodiment, the spatial light modulator 30a (as well as 30b) comprises a digital micromirror device (DMD). Examples of digital micromirror devices are provided in U.S. Pat. No. 5,061,049 issued Oct. 29, 1991 and U.S. Pat. No. 5,083,857 issued Jan. 28, 1992, both of which are incorporated herein by reference. Any of the variations of DMD devices described in these patents may be used in the present system. For the sake of simplicity, description of these devices will not be repeated herein. Reference may be made to the cited patents for the details of the DMD 30a.

The image projected from the second spatial light modulator device 30b is generated from a system 5b similar to the system 5a just described. This image is generated from the light source 10b which directs a beam to mirror 16b which in turn redirects the beam to lens system 18b. The lens 18b focuses the light on color wheel 20b which then transmits the light to lens system 24b. The lens 24b transmits the light to cold mirror 26b which redirects the light to TIR prism 28b and then to spatial light modulator 30b. The spatial light modulator 30b modulates the light and directs it through the TIR prism 28b to lens 32b. As before, the color wheel 20b may be rotated by means of color wheel motor 22b and IR stop/heat sink 36b may be utilized to prevent overheating of mirror 16b.

The system illustrated in FIG. 1 can be run with both single modulator projectors 5a and 5b completely synchronized, for example, by computer control. That is, both projectors 5a and 5b may project the same frequency of red, green and blue color fields thereby doubling the total projected lumens. By running the systems with synchronized but offset color fields, that is, for example, one system running red, green and blue, while the other runs green, blue and red, the total projected lumens are again doubled but the field sequential color separation arifacts will be reduced due to the presence of two different color fields on the screen simultaneously. If offset color fields are utilized, the color wheels 20a and 20b (along with motors 22a and 22b) can be replaced with a single color wheel (not shown). This implementation will reduce the amount of hardware required.

Either of these implementations may also be able to alleviate the gray level contouring artifacts or extend the number of projected gray levels by using separate bit splitting techniques at the two modulators 30a and 30b. Techniques for bit splitting are described in U.S. Pat. No. 5,339,116 and co-pending applications 08/275,057, 08/176, 618, 08/177,013, 08/264,387, and 08/280,032, each of which is incorporated herein by reference.

The system shown in FIG. 1 has twice as much hardware as a single modulator system, including two lamps 10a and 10b, possibly two color wheels 20a and 20b, and two completely separate illumination and projection systems (including DMDs 30a and 30b). The system shown in FIG. 2 is an alternate embodiment that reduces the need for separate lamps and color wheels and reduces the amount of illumination hardware in the system.

Referring to the specific embodiment illustrated in FIG. 2, light source 10 generates a light beam (illustrated on path 14) which is directed to (cold) mirror 16. The IR step stop/heat sink 36 is provided to prevent the mirror 16 from becoming too hot. The light beam 14 is reflected from mirror 16 towards lens 18 wherein it is focused on color wheel 40.

A first light beam 42 is transmitted through the color wheel 40 to lens system 24a wherein it is subsequently reflected from mirror 26a to TIR prism 28a and then to spatial light modulator 30a. A second light beam 44 is reflected from color wheel 40 to spherial reflector 46 and then back to another portion of color wheel 40. The second light beam is then transmitted to lens 24b which focuses the second light beam 44 on mirror 26b. The light beam is then directed to TIR prism 28b and then to the spatial light modulator 30b.

In this arrangement, light from the lamp 10 is focused onto a dichroic color wheel 40 which transmits a primary color (red, green, or blue) while reflecting the complimentary colors (cyan, magenta or yellow). The reflected light from color wheel 40 is reimaged back onto the color wheel 40 at a spot that passes one of the other primary colors. For example, the light is reimaged at a point 120° ahead of the first focus spot on the wheel 40. This illumination system provides two separate illumination paths, one with a sequence of red, green then blue illumination and the second with green, blue and then red illumination.

Since there does not appear to be a simple way of recombining the two images from the modulators 30a and 30b, separate projection lens 32a and 32b are recommended (but not required).

The embodiment represented by FIG. 2 produces the same increase in projected lumens as the system of FIG. 1 but uses only a single lamp 10 and color wheel 40. The system uses offset color fields that will provide an alleviation from a field sequential color separation artifacts, and the same potential for suppression of gray level contouring artifacts.

The system shown in FIG. 3 is another embodiment that further reduces the amount of system hardware needed for a two modulator projector. In this system, a single lamp 10 (e.g., a metal halide arc lamp) is focused to a color wheel 50 that always passes one of the primary colors, and alternates between the other two. For example, if the wheel 50 always passes red and alternates between green and blue, the wheel 50 would be made of yellow and magenta segments (since red and green combine for yellow and red and blue combine for magenta). The light passing the color wheel 50 is relayed through a color splitting prism 52 that passes the dominant color (red in the example) to one modulator 30a and the other colors to the second modulator 30b. The color splitting prism 52 also recombines the color fields when a reflective modulator is used. As indicated in the figure, for a reflective modulator, a TIR prism 28 is also used in the illumination path to provide the proper illumination angle and to allow the precombined color fields to be imaged by a single projection lens 32.

The TIR prism relies on a uniformly thin air gas which is typically created with small (approximately 10 micron) spacer balls such as 27a and 27b shown in FIG. 2a. The spacer balls are suspended in the adhesive 29 of FIG. 2a that holds the two prisms together. Similar air gaps may be used in the color splitting prism as well to facilitate coating design and prism assembly.

In this system, the dominant color will be three times brighter than in a standard single modulator system, since it is projected for the complete frame rather than only one-third of the frame. The other two colors are 50% (i.e., one and a half times) brighter since they will be projected for half the frame rather than one-third of the frame. Thus, if the lamp 60 is uniformly color balanced to begin with, attenuation of the dominant color path by 50% will produce a uniform color balance with a total projected lumen output 50% higher than a single modulator system.

This embodiment is particularly attractive when the lamp 10 has a color imbalance caused by deficient output of one of the three primary colors. For example, consider a lamp 10 that has only half the red output as needed for proper color balance. The system described here with no attenuation in the right channel will boost the red output relative to the green and blue to the point of proper color balance. This will provide a system that is approximately 3 times as bright as a color balanced single modulator system and equal in brightness to a color balanced three modulator system.

In the specific embodiment of FIG. 3, light source 10 generates a beam of light which is directed to (cold) mirror 16. Once again heat sink 36 may be provided to prevent the mirror 16 from becoming too hot. The light is reflected from mirror 16 to lens 18 whereafter it is focused upon color wheel 50. The color wheel 50 may be driven by color wheel motor 22. The light from color wheel 50 is directed to lens 24 whereby it is focused upon mirror 26. The light from mirror 26 is directed to TIR prism 28 whereafter it is directed through color splitting prisms 52 to either spatial light modulator 30a or spatial light modulator 30b. As previously discussed, the spatial light modulators 30a and 30b may comprise digital micromirror devices. The modulated light from spatial light modulators 30a and 30b is directed back through color splitting prism 52 through TIR prism 28 to projection lens 32 which may project the image to a screen (not illustrated in FIG. 3).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A full-color projection system comprising:
   a single light source which generates a single beam of light; and
   a color-splitting prism for dividing said single beam of light into first and second light beams wherein the prism has an air gap in which are a plurality of spacer balls suspended in an adhesive;
   a first spatial light modulator for receiving said first light beam and redirecting a modulated version of said first light beam to a screen; and
   a second spatial light modulator for receiving said second light beam and redirecting a modulated version of said second light beam to said screen.

2. The system of claim 1 wherein said first and second spatial light modulators comprise digital micro-mirror devices.

3. A fill color projection system comprising:
   a light source for generating a beam of light;
   a color wheel for receiving said beam of light and passing a filtered light beam;
   a color splitting prism for directing a first portion of said filtered light beam to a first spatial light modulator and a second portion of said filtered light beam to a second spatial light modulator, wherein said prism includes an air gap in which are spacer balls suspended in an adhesive; and
   a screen for receiving modulated light from both said first and second spatial light modulators.

4. The system of claim 3 wherein said color wheel passes light of one primary color all the time and light of the other primary colors half of the time, wherein the primary colors consist of red, green and blue.

5. The system of claim 4 wherein said color wheel comprises first and second segments, said first segment for passing magenta colored light and said second segment for passing yellow colored light.

6. The system of claim 3 and further comprising a total internal reflection prism positioned between said color splitting prism and said screen.

* * * * *